United States Patent [19]
Terunuma et al.

[11] Patent Number: 5,936,812
[45] Date of Patent: Aug. 10, 1999

[54] THIN FILM MAGNETIC HEAD WITH INDUCTIVE MAGNETIC CONVERSION ELEMENT AND MAGNETORESISTIVE CONVERSION ELEMENT

[75] Inventors: Koichi Terunuma, Hoya; Yuji Ohtsubo, Saku, both of Japan

[73] Assignee: TDK Corporation, Tokyo, Japan

[21] Appl. No.: 08/923,275

[22] Filed: Sep. 4, 1997

[30] Foreign Application Priority Data

Sep. 6, 1996 [JP] Japan .................................. 8-236130

[51] Int. Cl.⁶ ...................................................... G11B 5/39
[52] U.S. Cl. ........................................... 360/113; 360/126
[58] Field of Search .................................. 360/113, 119, 360/126; 324/252; 338/32 R

[56] References Cited

U.S. PATENT DOCUMENTS

| | | | |
|---|---|---|---|
| 4,881,143 | 11/1989 | Bhattacharyya et al. | 360/113 |
| 4,907,113 | 3/1990 | Mallary | 360/113 |
| 4,918,554 | 4/1990 | Bajorek et al. | 360/113 |
| 5,193,039 | 3/1993 | Smith et al. | 360/113 |
| 5,255,141 | 10/1993 | Valstyn et al. | 360/126 |
| 5,558,944 | 9/1996 | Terunuma | 428/611 |
| 5,703,740 | 12/1997 | Cohen et al. | 360/126 |

FOREIGN PATENT DOCUMENTS

| | | |
|---|---|---|
| 61-258323 | 11/1986 | Japan . |
| 2-116009 | 4/1990 | Japan . |

*Primary Examiner*—David D. Davis
*Attorney, Agent, or Firm*—Oblon, Spivak, McClelland, Maier & Neustadt, P.C.

[57] ABSTRACT

An upper magnetic layer and a lower magnetic layer of an inductive magnetic conversion element constitute pole tips which face opposite each other over a gap layer at their front end portions and have a back gap portion for completing a thin film magnetic circuit at the rear. A magnetoresistive element is provided on a slider below the inductive magnetic conversion element between an upper shield layer positioned above it and a lower shield layer positioned below it. The upper shield layer also constitutes the lower magnetic layer of the inductive magnetic conversion element. The lower shield layer is formed outside a projection area achieved by projecting the back gap portion onto the surface where the lower shield layer is formed.

7 Claims, 12 Drawing Sheets

THIN FILM MAGNETIC HEAD WITH INDUCTIVE MAGNETIC CONVERSION ELEMENT AND MAGNETORESISTIVE CONVERSION ELEMENT

BACKGROUND OF THE INVENTION

1. Field of the Invention

The present invention relates to a combined type thin film magnetic head provided with both an inductive magnetic conversion element and a magnetoresistive (hereafter referred to as MR) element.

2. Discussion of Background

A combined type thin film magnetic head of this type employs an inductive magnetic conversion element for a recording element and employs an MR element for a reproduction element. One of the features of such a combined type magnetic head is that, since the reproduction output of the MR element is not dependent upon the speed of the recording medium, high reproduction output can be achieved.

The inductive magnetic conversion element constituting the recording element in a combined type magnetic head is provided with a thin film magnetic circuit comprising a lower magnetic layer, an upper magnetic layer and a coil layer and is positioned on a slider. The front ends of the upper magnetic layer and the lower magnetic layer constitute pole tips which face opposite each other via a gap layer, and the upper magnetic layer and the lower magnetic layer are provided with a back gap portion for completing the thin film magnetic circuit in the rear.

The MR element is provided on the slider under the inductive magnetic conversion element and is positioned between an upper shield layer positioned above it and a lower shield layer positioned below it. Normally, the upper shield layer also functions as the lower magnetic layer of the inductive magnetic conversion element. By absorbing the superfluous magnetic flux that is not required for a read operation, the upper shield layer and the lower shield layer contribute to improving the resolution and the high frequency characteristics and to improving the recording density.

The basic structure of the combined type magnetic head such as described above is disclosed in, for instance, Japanese Unexamined Patent Publication (KOKAI) No. 116009/1990 and Japanese Unexamined Patent Publication (KOKAI) No. 258323/1986.

The MR element employed in a combined type magnetic head includes an MR film and a magnetic domain control film. The MR film may be one that utilizes the anisotropic magnetoresistance effect or the giant magnetoresistance effect, such as a spin valve film structure.

The magnetic domain control film applies magnetic domain control upon the MR film. In other words, it sets the MR film in a state of being a single magnetic domain, to prevent noise (Barkhausen noise) caused by irregular movement of the magnetic domain wall. Normally, the magnetic domain control film is also utilized as a conductive path in itself, or in a state achieved by being laminated with a non-magnetic conductive film.

The inductive magnetic conversion element is laminated onto the MR element achieving a positional relationship whereby the magnetic domain control film and the lower shield layer are positioned below the back gap portion of the upper magnetic layer and the lower magnetic layer.

One of the problems of the combined type magnetic head described above is that since the magnetic domain control film and the lower shield layer are located extremely close to both the lower magnetic layer and the back gap portion in the area under the back gap portion of the upper magnetic layer and the lower magnetic layer, a magnetic circuit passing from the back gap portion through the lower shield layer and the magnetic domain control film is formed parallel to the original magnetic circuit achieved by the lower magnetic layer, resulting in a portion of the recording magnetic flux being leaked to the lower shield layer and the magnetic domain control film. Since this leaked magnetic flux passes through the MR film, it changes the magnetization of the MR film. This change of magnetization dissipates when a specific length of time has elapsed after the recording current is cut off. However, if recording/reproduction is repeated in cycles of shorter duration than this dissipation time, there will be residual magnetization change in the MR film at the time of reproduction, adversely affecting the reproduction output characteristics. The adverse effect of the leaked magnetic field on the reproduction characteristics is manifested as noise, such as, for instance, fluctuation in the reproduction output, asymmetric fluctuation and distorted reproduction waveforms. This problem becomes more pronounced as the lower magnetic layer and the gap layer become thinner.

SUMMARY OF THE INVENTION

It is an object of the present invention to provide a combined type thin film magnetic head capable of achieving stable reproduction output characteristics even when recording/reproduction is repeated in short cycles.

It is a further object of the present invention to provide a combined type thin film magnetic head capable of achieving stable reproduction output characteristics even when recording/reproduction is repeated in short cycles by preventing the recording magnetic flux from leaking to the shield layers that magnetically shield the MR element.

It is a still further object of the present invention to provide a combined type thin film magnetic head capable of achieving stable reproduction output characteristics even when recording/reproduction is repeated in short cycles by preventing recording magnetic flux from leaking to the ferromagnetic film included in the MR element.

In order to achieve the objects described above, the thin film magnetic head according to the present invention includes a slider, at least one inductive magnetic conversion element and at least one MR element. The inductive magnetic conversion element is provided with a thin film magnetic circuit comprising a lower magnetic layer, an upper magnetic layer and a coil layer and is positioned on the slider. The upper magnetic layer and the lower magnetic layer constitute pole tips which face opposite each other at their front end portions via a gap layer, and the upper magnetic layer and the lower magnetic layer are provided with a back gap portion for completing the thin film magnetic circuit in the rear.

The MR element is provided on the slider, below the inductive magnetic conversion element and is positioned between an upper shield layer that is positioned above it and a lower shield layer that is positioned below it. The upper shield layer also functions as the lower magnetic layer of the inductive magnetic conversion element.

The lower shield layer is formed outside of a projection area that is achieved by projecting the back gap portion on the surface where the lower shield layer is formed.

With the thin film magnetic head according to the present invention, since the front end portions of the upper magnetic layer and the lower magnetic layer of the inductive magnetic conversion element provided on the slider constitute the pole tips that face opposite each other via a gap layer, magnetic recording can be performed on a magnetic recording medium by a recording magnetic field generated at the pole tips. Since the upper magnetic layer and the lower magnetic layer are provided with a back gap portion for completing the thin film magnetic circuit in the rear, a thin film magnetic circuit that achieves a high degree of efficiency is constituted by the upper magnetic layer and the lower magnetic layer.

The MR element is provided on the slider below the inductive magnetic conversion element to reproduce the magnetic recording on the magnetic recording medium. Consequently, a high reproduction output that is not dependent upon the speed of the magnetic medium is achieved.

Since the MR element is positioned between the upper shield layer which is positioned above it and the lower shield layer which is positioned below it, any superfluous magnetic flux that is not required for a read operation is absorbed by the upper shield layer and the lower shield layer, thereby making it possible to achieve an improvement in the resolution and the high frequency characteristics and an improvement in the recording density.

With the upper magnetic shield layer also functioning as the lower magnetic layer of the inductive magnetic conversion element, a contribution to achieving a thinner head and a reduction in the length of time required to complete the manufacturing process is achieved.

In the structure described above, since the lower shield layer is formed outside of the projection area, which is achieved by projecting the back gap portion of the upper magnetic layer and the lower magnetic layer onto the surface where the lower shield layer is formed, it is possible to restrict the leakage of recording magnetic flux to the lower shield layer. Thus, stable reproduction output characteristics are achieved even when recording/reproduction is repeated in short cycles.

Another means for achieving the objects according to the present invention is adopted when the MR element includes an MR layer and a magnetic domain control film. The magnetic domain control film, which applies magnetic domain control upon the MR layer, is formed outside of the projection area achieved by projecting the back gap portion onto the surface where the magnetic domain control film is formed. With this structure, it is possible to restrict the leakage of recording magnetic flux to the magnetic domain control film that is included in the MR element. Thus, stable reproduction output characteristics can be achieved even when recording/reproduction is repeated in short cycles.

By forming both the lower shield layer and the magnetic domain control film outside of the projection area of the back gap portion, the recording magnetic flux is restricted from leaking to either the lower shield layer or the magnetic domain control film.

BRIEF DESCRIPTION OF THE DRAWINGS

More specific features and advantages of the present invention are explained in further detail in reference to the drawings, wherein.

DETAILED DESCRIPTION OF THE PREFERRED EMBODIMENTS

Figure 1:
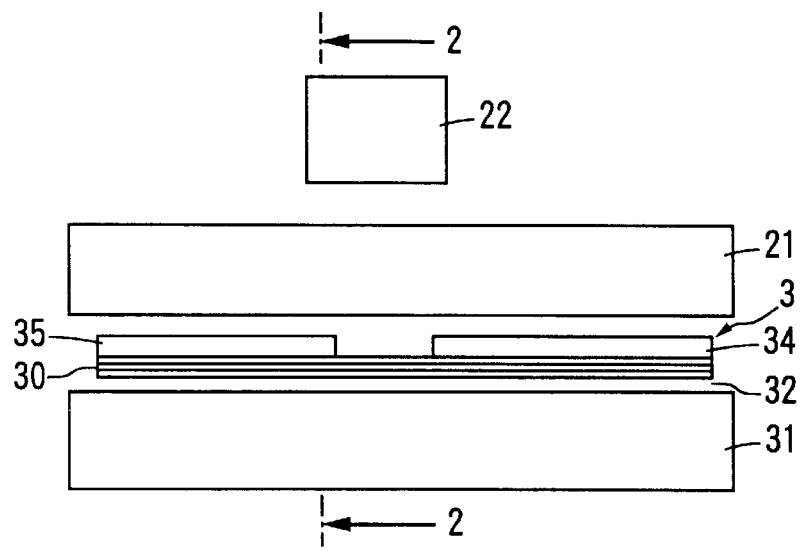
FIG. 1 is a front view illustrating the positions of the elements constituting a thin film magnetic head according to the present invention viewed from the air bearing surface (hereafter referred to as ABS)
Figure 2:
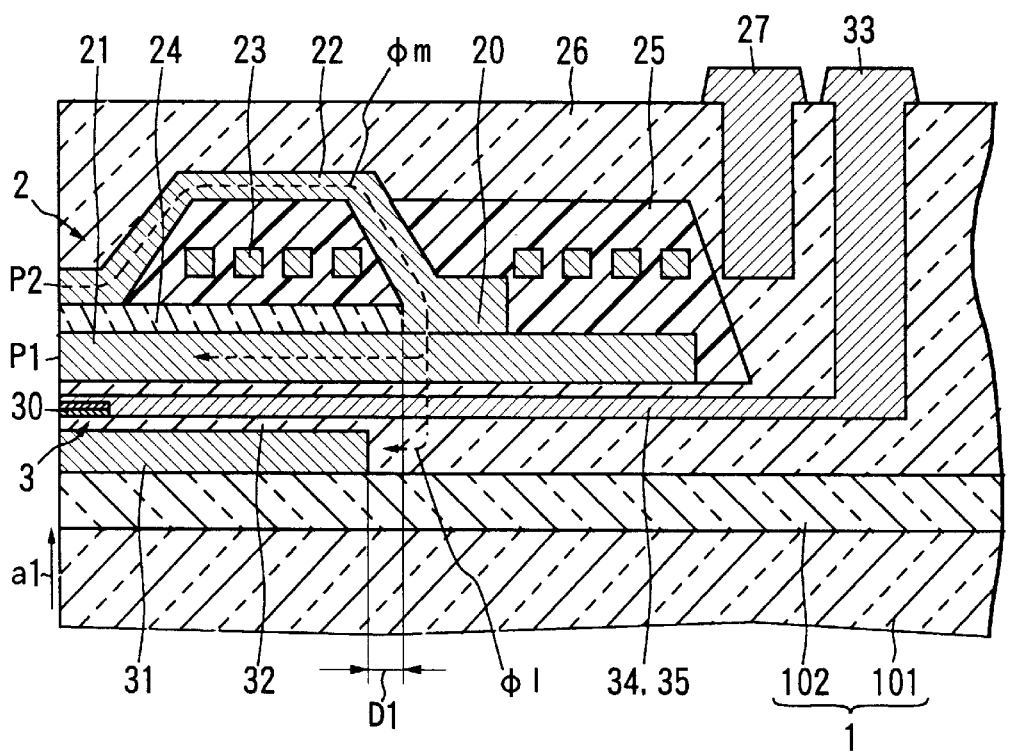
FIG. 2 is a cross section through line 2—2 in FIG. 1.

Referring to FIG. 1 and 2, in which dimensions are exaggerated for clarity, the thin film magnetic head according to the present invention includes a slider 1, an inductive magnetic conversion element 2 and an MR element 3. The slider 1 in the embodiment has a structure in which an insulating film 102 constituted of $Al_2O_3$ or the like is formed onto a base body 101 which is constituted of $Al_2O_3$-TiC or the like. The MR element 3 and the inductive magnetic conversion element 2 are laminated on the insulating film 102. Although not shown, the slider 1 normally has rail portions at the surface facing opposite the medium, with the surface of the rail portions constituting an air bearing surface 11. The slider 1 may be provided with 1 to 3 rail portions or it may be constituted of a flat surface without rail portions. In addition, the surface facing opposite the medium may take various geometric shapes for purposes such as improving the flying characteristics. The present invention is adopted in any such slider.

The magnetic conversion elements 2 and 3 are provided at an end portion of the slider 1 in the direction a1 of medium movement. The direction a1 of medium movement matches the direction in which the air that is set in motion by the high speed movement of the medium, flows out. The inductive magnetic conversion element 2 is a recording element, whereas the MR element 3 is a reproduction element.

The inductive magnetic conversion element 2, which is to function as a recording element, is provided with a lower magnetic layer 21 that also functions as the upper shield layer of the MR element 3, an upper magnetic layer 22, a coil film 23, a gap film 24 constituted of alumina or the like, an insulating film 25 constituted of an organic resin such as Novolak® and a protective film 26 constituted of alumina or the like.

The front end portions of the lower magnetic layer 21 and the upper magnetic layer 22 constitute a lower pole tip P1 and an upper pole tip P2 respectively, which face opposite each other across the gap film 24 with a very small thickness, and write is performed with the lower pole tip P1 and the upper pole tip P2. The lower magnetic layer 21 and the upper magnetic layer 22 are linked with each other in such a manner that their yoked portions complete a magnetic circuit at a back gap portion 20 which is on the opposite side from the lower pole tip P1 and the upper pole tip P2.

The coil film 23 is formed on the insulating film 25, winding around the back gap portion 20 in a coil. The number of turns and the number of layers of the coil film 23 are not restricted. The coil film 23 is connected to bumps 27 which are provided as a pair. With the inductive magnetic conversion element 2 structured as described above, a thin film magnetic circuit that achieves a high degree of efficiency is constituted. In addition, magnetic recording can be performed on a magnetic recording medium (not shown) by utilizing the recording magnetic fields generated at the pole tips P1 and P2 positioned at the front end portions of the lower magnetic layer 21 and the upper magnetic layer 22.

The lower magnetic layer 21 and the upper magnetic layer 22 may be constituted by using a material selected from a wide range of materials in the known art. Specific examples include amorphous materials such as FeAlSi and Co—group materials, or NiFe, CoFe, FeN, FeMN, FeMC and the like. In FeMN and FeMC, M represents at least one substance selected from Zr, Ta, Hf, Mo, W, Al and Si. The film thicknesses of the lower magnetic layer 21 and the upper magnetic layer 22 may be, for instance, 1 to 5 $\mu$m.

Various film structures have been disclosed and put into practical use to date that may constitute the MR element 3. They include, for instance, a film structure employing an anisotropic magnetoresistive film constituted of permalloy or the like and one which employs a giant magnetoresistance (GMR) effect film, such as a spin valve film. According to the present invention, high reproduction output which does not depend upon the speed of the recording medium is achieved regardless of which type of MR element is employed.

In a specific example of the MR element 3, lead conductor films 34 and 35 which include a magnetic domain control film, are provided in the passive areas located at the two sides of an MR film 30. The magnetic domain control films included in the lead conductor films 34 and 35 may be each constituted of a permanent magnet film or constituted as a laminated film comprising a permanent magnet film and a non-magnetic conductive film or a laminated film comprising an antiferromagnetic film and a ferromagnetic film. A film constituted of CoPt, CoPtCr, CoP or the like may be used to constitute the permanent magnet film. The non-magnetic conductive film which is to be laminated with a permanent magnet film may be constituted of Cr, Ti, W, Ta, Cu, Au, or the like. The antiferromagnetic film may be constituted of FeMn, NiMn, NiO, CoO, $Fe_2O_3$ (hematite) or the like and the ferromagnetic film which is laminated on it may be constituted of a soft magnetic film such as NiFe, NiFeX (X=Rh, Ir, Ta, Cr, Zr, etc.), a Co group amorphous material CoFe or the like or may be constituted of a permanent magnet film such as CoPt, CoPtCr, CoP or the like. The selection of these materials and their film thicknesses are made in correspondence to the structure of the desired MR film 30.

The MR element 3 is provided inside an insulating film 32 between a lower shield layer 31 and the lower magnetic layer 21 which also functions as an upper shield layer. The insulating film 32 may be constituted of, for instance, $Al_2O_3$ and its film thickness is set at approximately 10 to 300 nm.

In the shield structure described above, superfluous magnetic flux that is not required for a reproduction operation is absorbed by the lower magnetic layer 21, which functions as the upper shield layer and the lower shield layer 31, thereby improving the resolution and high frequency characteristics and thereby improving the recording density. In addition, since the upper shield layer 21 is constituted of the lower magnetic layer 21 of the inductive magnetic conversion element 2, a thinner magnetic head and a reduction in the length of time required for the manufacturing process are achieved.

Figure 3:
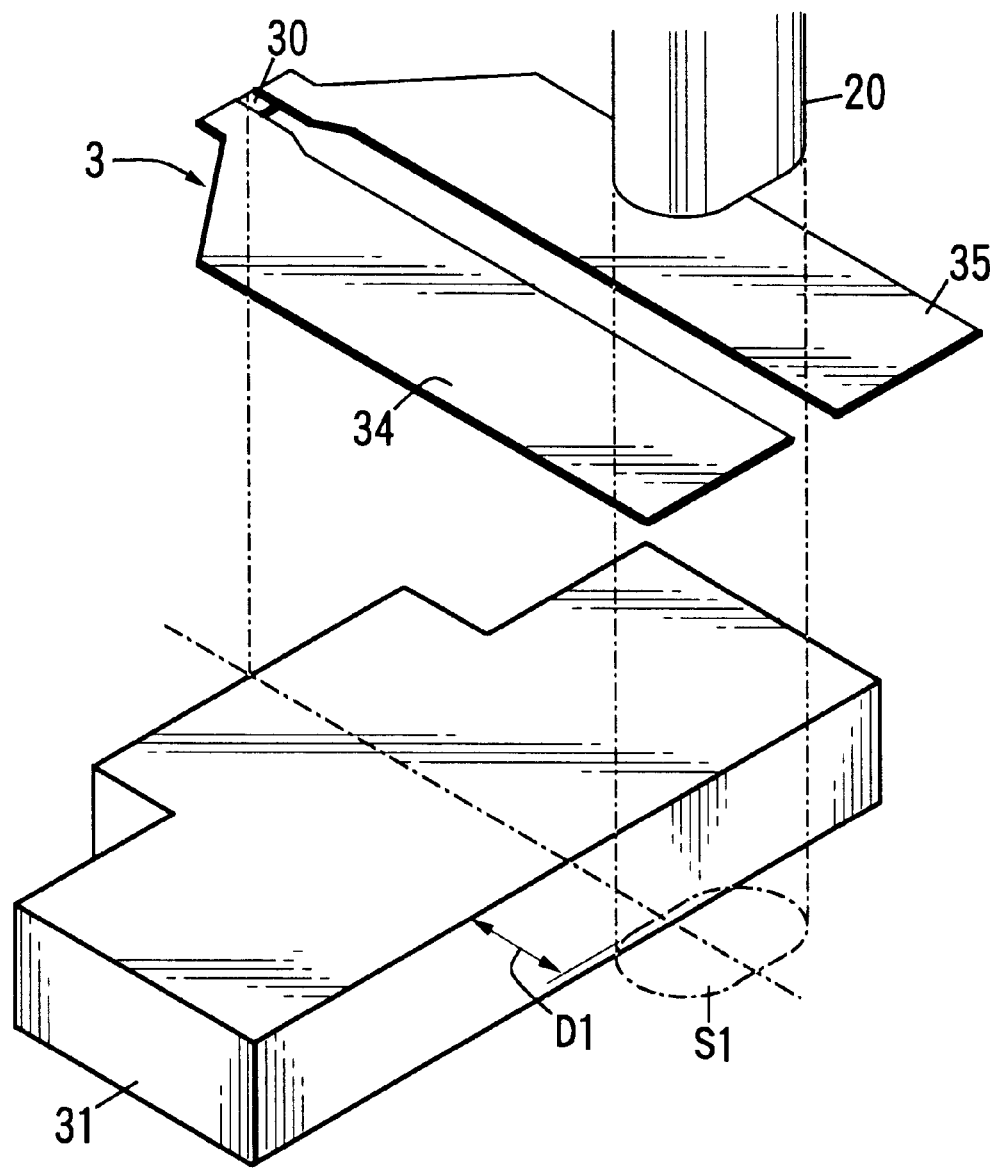
FIG. 3 is a perspective illustrating the positional relationship that the lower shield layer has with the back gap portion of the inductive magnetic conversion element.

FIG. 3 is a perspective illustrating the positional relationship that the lower shield layer 31 has with the back gap portion 20 of the inductive magnetic conversion element 2. As shown in the figure, the lower shield layer 31 is formed outside of a projection area S1 which is achieved by projecting the back gap portion 20 onto the surface where the lower shield layer 31 is formed. In this embodiment, the entirety of the lower shield layer 31 is formed ahead of the back gap portion 20 by a distance D1.

With this structure, the magnetic resistance of the magnetic circuit extending from the back gap portion 20 to the lower shield layer 31 is increased due to the distance D1 and the recording magnetic flux ø m, which is generated when a recording current flows to the coil film 23, flows exclusively from the back gap portion 20 to the lower magnetic layer 21, resulting in a great reduction in leaked magnetic flux ø1 flowing from the back gap portion 20 to the lower shield layer 31. Thus, even when recording/reproduction is repeated in short cycles, stable reproduction output characteristics are achieved.

Figure 4:
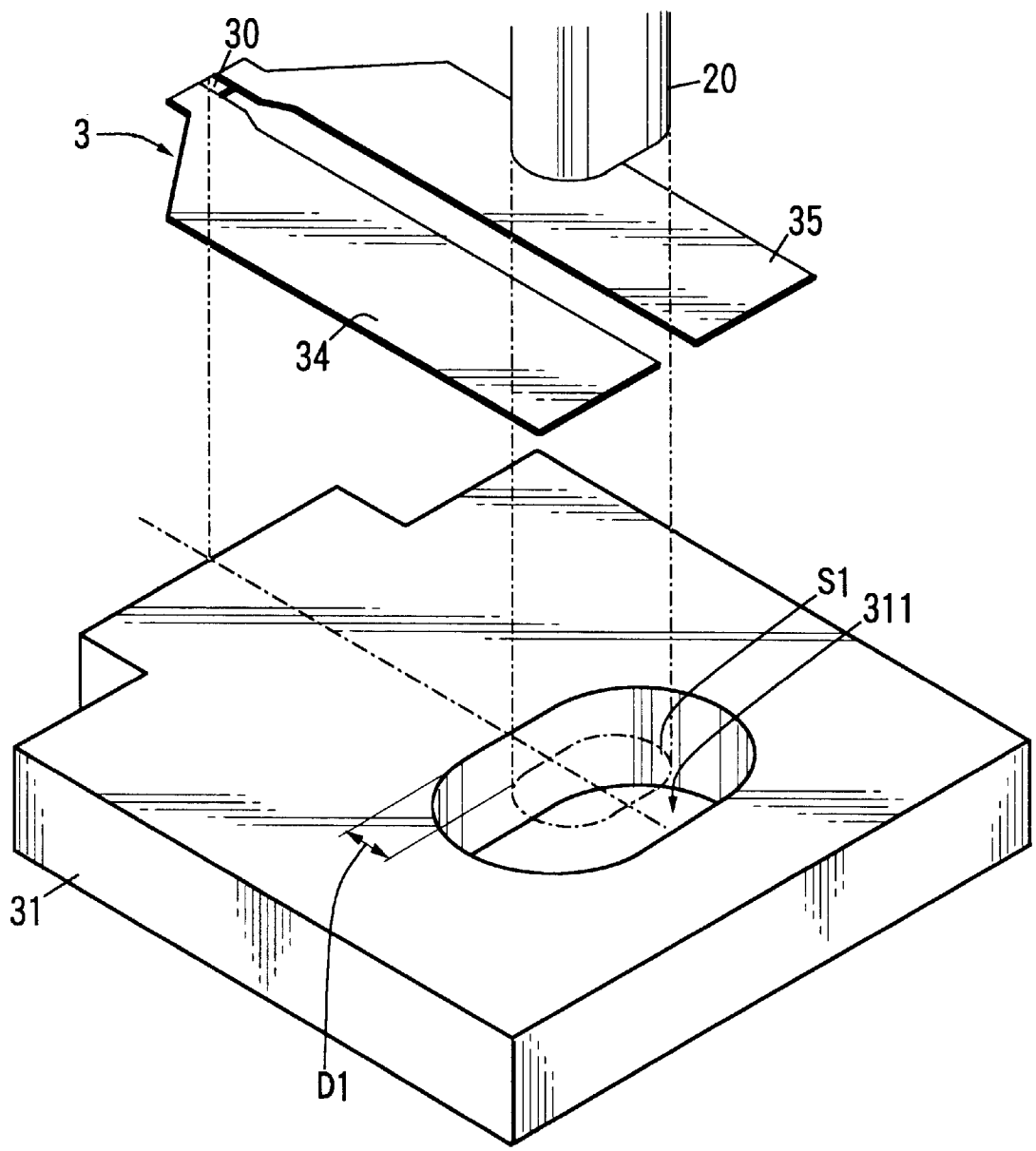
FIG. 4 is a perspective illustrating another positional relationship that the lower shield layer has with the back gap portion of the inductive magnetic conversion element.

FIG. 4 is a perspective illustrating another positional relationship that the lower shield layer 31 may have with the back gap portion 20 of the inductive magnetic conversion element 2. In this embodiment, the lower shield layer 31 is formed rearward of the back gap portion 20, avoiding the projection area S1 achieved by projecting the back gap portion 20 onto the surface where the lower shield layer 31 is formed. To be more specific, a hole 311, which includes the projection area S1 over a distance D1 is provided.

In this embodiment, too, the magnetic resistance of the magnetic circuit extending from the back gap portion 20 to the lower shield layer 31 is increased due to the distance D1, resulting in a great reduction in leaked magnetic flux ø1 flowing from the back gap portion 20 to the lower shield layer 31. Because of this, even when recording/reproduction is repeated in short cycles, stable reproduction output characteristics are achieved. Furthermore, since the lower shield layer 31 is formed rearward of the back gap portion 20, the shield effect achieved by the lower shield layer 31 is enhanced compared to the embodiment illustrated in FIGS. 1 to 3.

Figure 5:
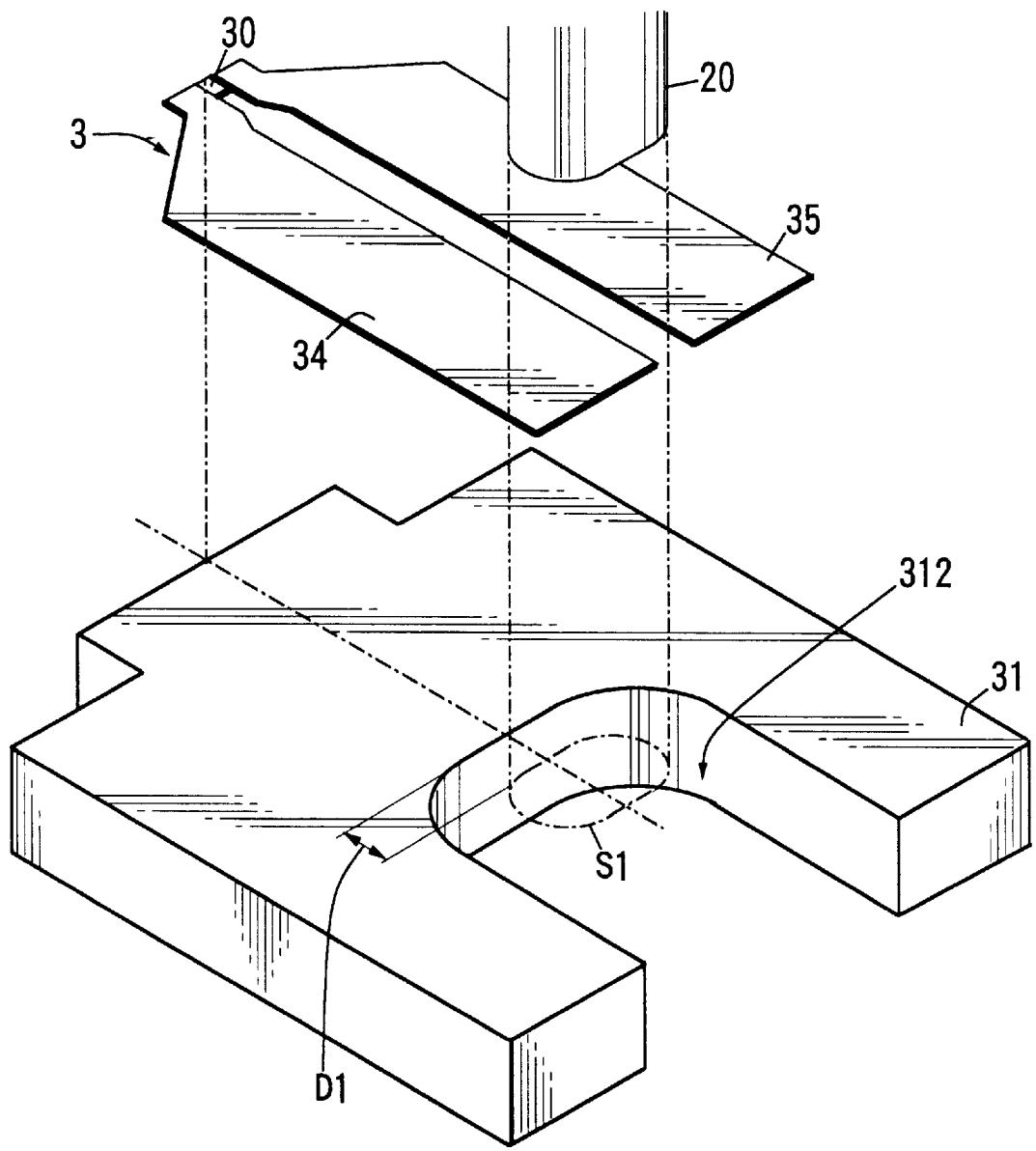
FIG. 5 is a perspective illustrating yet another positional relationship that the lower shield layer has with the back gap portion of the inductive magnetic conversion element.

FIG. 5 is a perspective illustrating yet another positional relationship that the lower shield layer 31 may have with the back gap portion 20. In this embodiment, a notch 312 is provided around the projection area S1 by allowing clearance over a distance D1. The rear of the notch 312 is left open. In this embodiment, too, advantages similar to those achieved in the embodiment shown in FIG. 4 are achieved.

Figure 6:
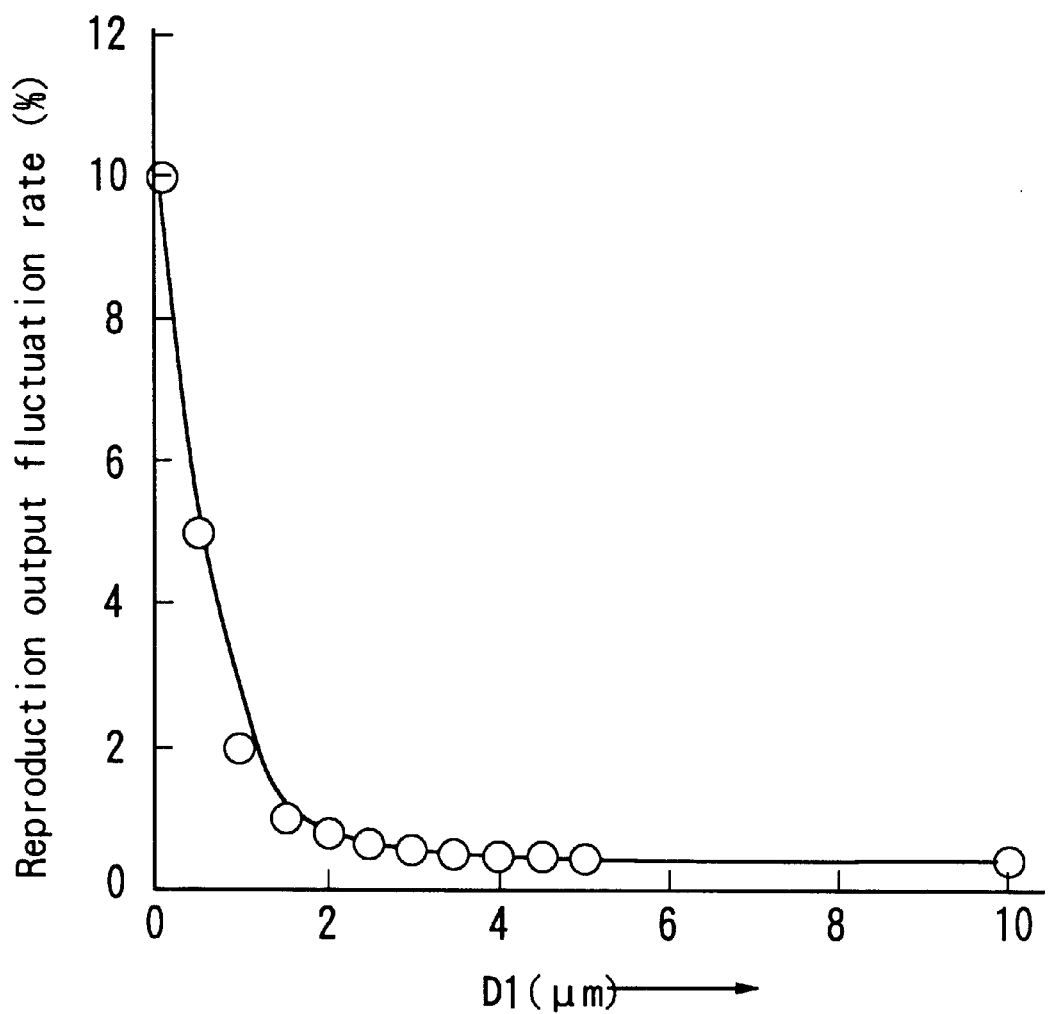
FIG. 6 is a graph showing the relationship between the distance D1 and the reproduction output fluctuation rate in the embodiment illustrated in FIGS. 1 to 3.

FIG. 6 is a graph showing the relationship between the distance D1 in the embodiment illustrated in FIGS. 1 to 3 and the reproduction output fluctuation rate. The structure of the essential portion of the magnetic head employed to achieve these characteristics is as follows in reference to FIGS. 1 to 3.

A. MR element 3
  MR film 30: NiFeCr (20 nm)/Ta (10 nm)/NiFe (15 nm)
  Lower shield layer 31: shape illustrated in FIGS. 1 to 3
  Insulating film 32: $Al_2O_3$ film, upper film thickness 100 nm,
  lower film thickness 100 nm
  Conductor films 34 and 35: magnetic domain control films
    constituted of FeMn (15 nm)/Ta (100 nm)
  Reproduction track width: 2.0 $\mu$m B. Inductive magnetic conversion element 2
  Lower magnetic layer 21: NiFe film, film thickness 3 $\mu$m
  Upper magnetic layer 22: NiFe film, film thickness 4 $\mu$m
  Coil film 23: Cu film, 10 turns
  Gap film 24: $Al_2O_3$ film, film thickness 300 nm
  Protective film 26: $Al_2O_3$ film, film thickness 40 $\mu$m
  Recording track width: 2.5 $\mu$m Using the combined type magnetic head described above, 100 cycles of recording/reproduction were repeated and its reproduction output fluctuation rate was determined. The reproduction output fluctuation rate was calculated using the following formula:

Reproduction output fluctuation rate (%)={(maximum output value−minimum output value)/(average output value)}×100(%)

The reproduction output fluctuation rate for the prior art is the value achieved when D1=0. As shown in the figure, the inflection point at which the reproduction output fluctuation rate is greatly improved is present in the vicinity where the distance D1 exceeds 1 $\mu$m, and the reproduction output fluctuation rate is markedly improved in the range over which D1>1 $\mu$m.

Figure 7:
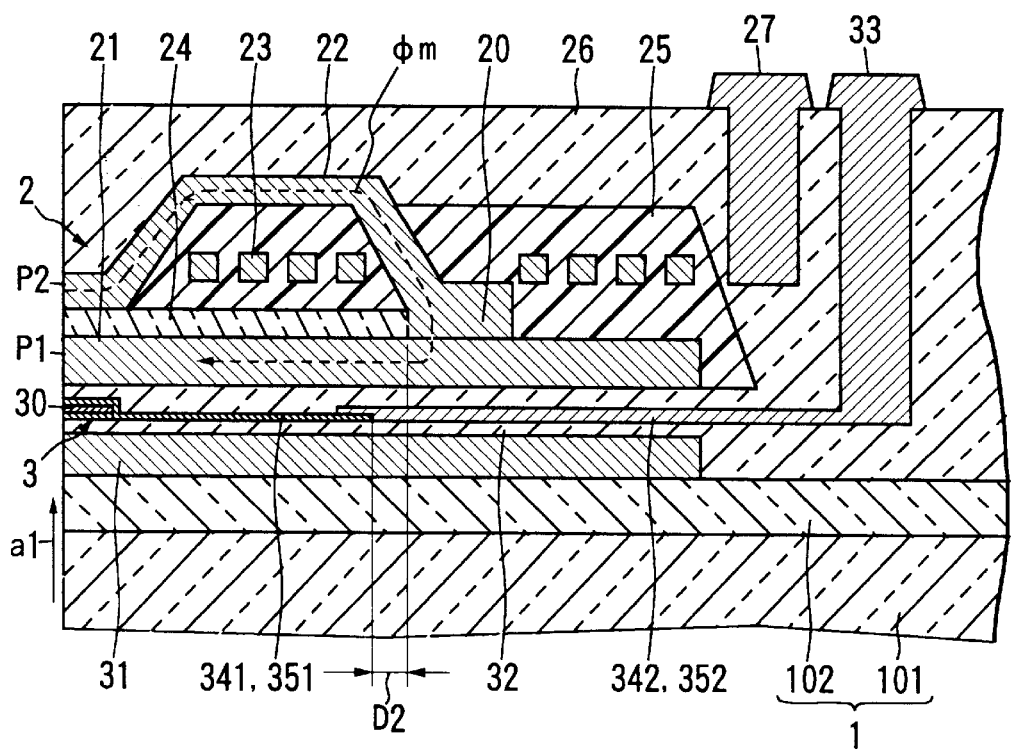
FIG. 7 is a cross section showing another embodiment of the thin film magnetic head according to the present invention.
Figure 8:
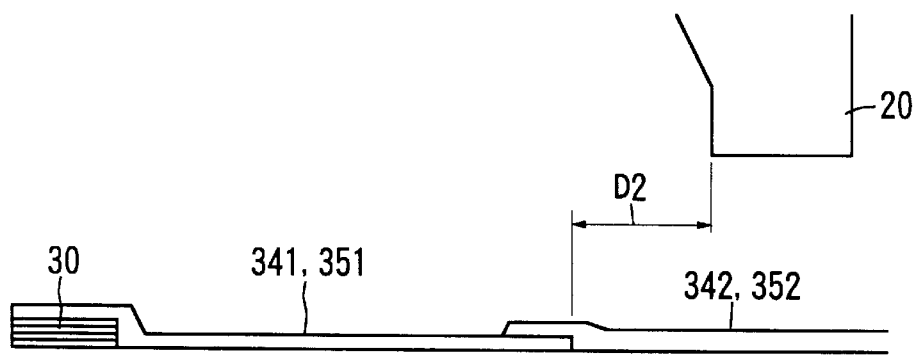
FIG. 8 shows the MR element in the thin film magnetic head shown in FIG. 7.
Figure 9:
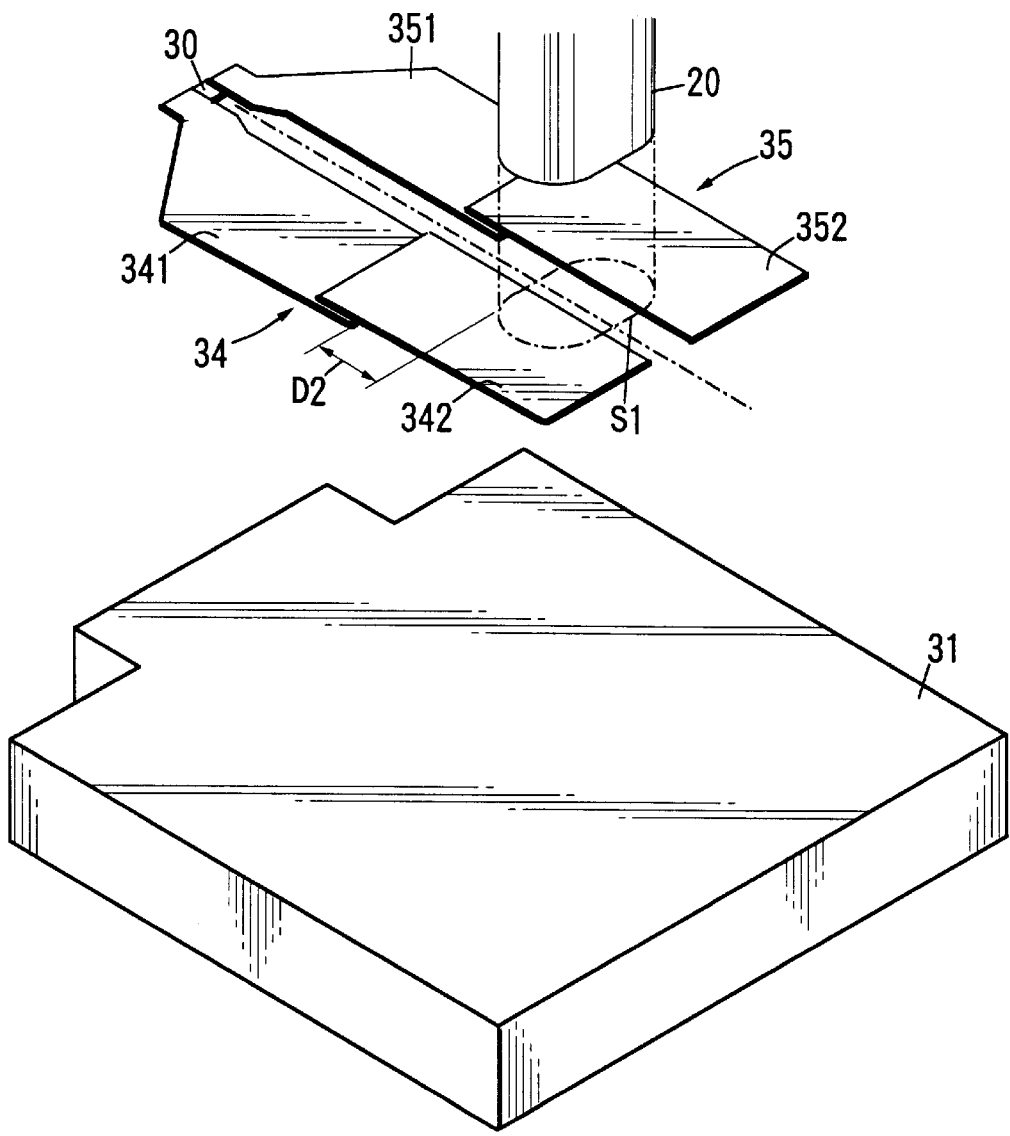
FIG. 9 is a perspective illustrating the positional relationship that the MR element has with the back gap portion of the inductive magnetic conversion element

FIG. 7 is a cross section showing another embodiment of the thin film magnetic head according to the present invention, FIG. 8 shows the MR element 3 in the thin film magnetic head shown in FIG. 7 and FIG. 9 is a perspective illustrating the positional relationship that the MR element 3 has with the back gap portion 20 of the inductive magnetic conversion element 2. In these figures, the same reference numbers are assigned to components that are identical to those shown in FIGS. 1 to 3 and their explanation is omitted.

The MR element 3 includes an MR film 30 and magnetic domain control films 341 and 351. The magnetic domain control films 341 and 351 are formed onto the two end portions of the MR film 30 in the direction of the tracks and formed outside of a projection area S1 achieved by projecting the back gap portion 20 onto the surface where the magnetic domain control films 341 and 351 are formed. Toward the rear ends of the magnetic domain control films 341 and 351, non-magnetic lead conductor films 342 and 352 are respectively connected and with these, lead conductor films 34 and 35 are constituted. The non-magnetic lead conductor films 342 and 352 are connected to bumps 33 which are constituted as a pair.

With this structure, the recording magnetic flux øm is restricted from leaking to the magnetic domain control films 341 and 351 included in the MR element 3. Thus, even when recording/reproduction is repeated in short cycles, stable reproduction output characteristics are achieved.

Figure 10:
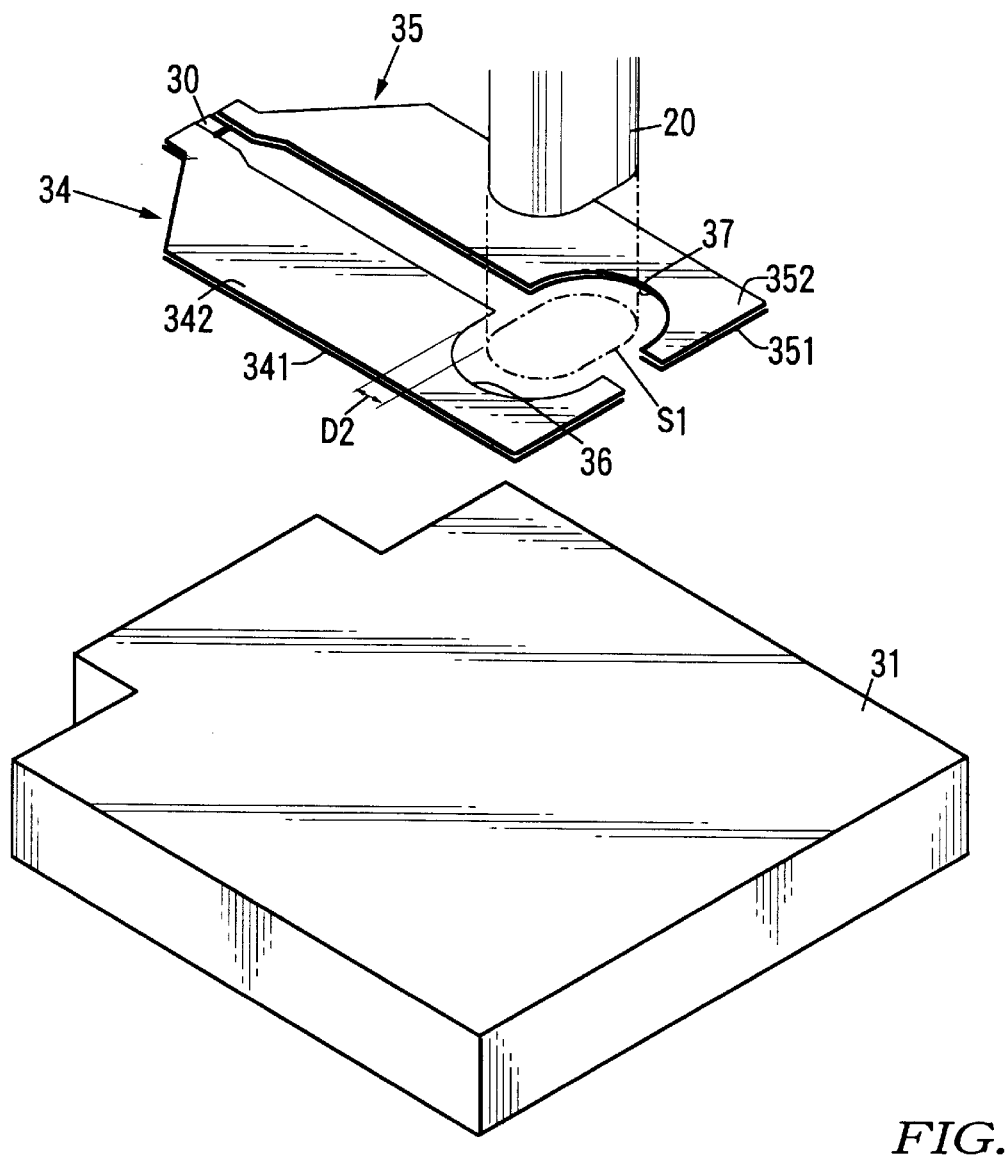
FIG. 10 is a perspective illustrating another positional relationship that the MR element has with the back gap portion of the inductive magnetic conversion element.

FIG. 10 is a perspective illustrating yet another positional relationship that the MR element 3 may have with the back gap portion 20 of the inductive magnetic conversion element 2. In this embodiment, the lead conductor films 34 and 35 are formed rearward of the back gap portion 20, outside the projection area S1 achieved by projecting the back gap portion 20 onto the surface where the lead conductor films 34 and 35 are formed. To be more specific, indented portions 36 and 37 are provided in the lead conductor films 34 and 35 respectively, surrounding the projection area S1 while allowing clearance over a distance D2.

The lead conductor films 34 and 35 may be constituted in such a manner that they are entirely constituted of the magnetic domain control films or in such a manner that they are each constituted as a laminated film comprising a magnetic domain control film and a non-magnetic conductive film. In the embodiment, the latter structure is adopted and non-magnetic conductive films 342 and 352 are laminated onto the magnetic domain control films 341 and 351 respectively, which are formed onto the two ends of the MR film 30 in the direction of the tracks. The examples of compositions 341, 351 and 342, 352 that the magnetic domain control films 341 and 351 and the non-magnetic conductive films 342 and 352 may adopt are as explained earlier.

In this embodiment, too, the magnetic resistance in the magnetic circuit extending from the back gap portion 20 to the lead conductor films 34 and 35 is increased due to the distance D2, resulting in a great reduction in leakage of the magnetic flux ø1 flowing from the back gap portion 20 to the lead conductor films 34 and 35. Thus, even when recording/reproduction is repeated in short cycles, stable reproduction output characteristics are achieved.

Figure 11:
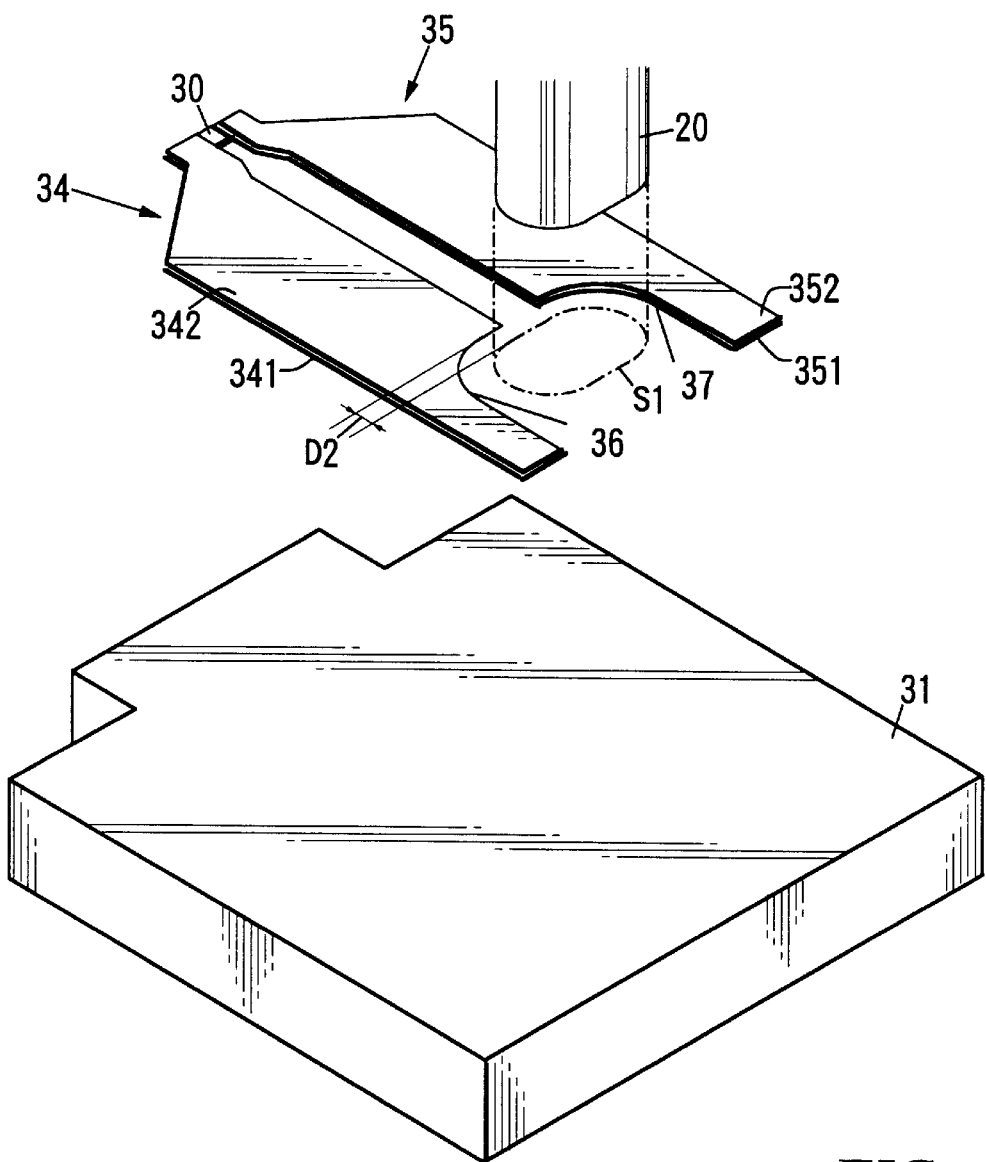
FIG. 11 is a perspective illustrating yet another positional relationship that the MR element has with the back gap portion of the inductive magnetic conversion element.

FIG. 11 is a perspective illustrating yet another positional relationship that the MR element 3 may have with the back gap portion 20. In this embodiment, the lead conductor films 34 and 35 are respectively provided with indented portions 36 and 37 over a distance D2 from the projection area S1. The rear portions of the indented portions 36 and 37 are made to open to a greater degree than that shown in FIG. 10. In this embodiment, too, advantages identical to those achieved in the embodiment shown in FIG. 10 are achieved. In FIG. 11, the lead conductor films 34 and 35 adopt a structure in which the non-magnetic conductive films 342 and 352 are respectively laminated over the entire surfaces of the magnetic domain control films 341 and 351.

Figure 12:
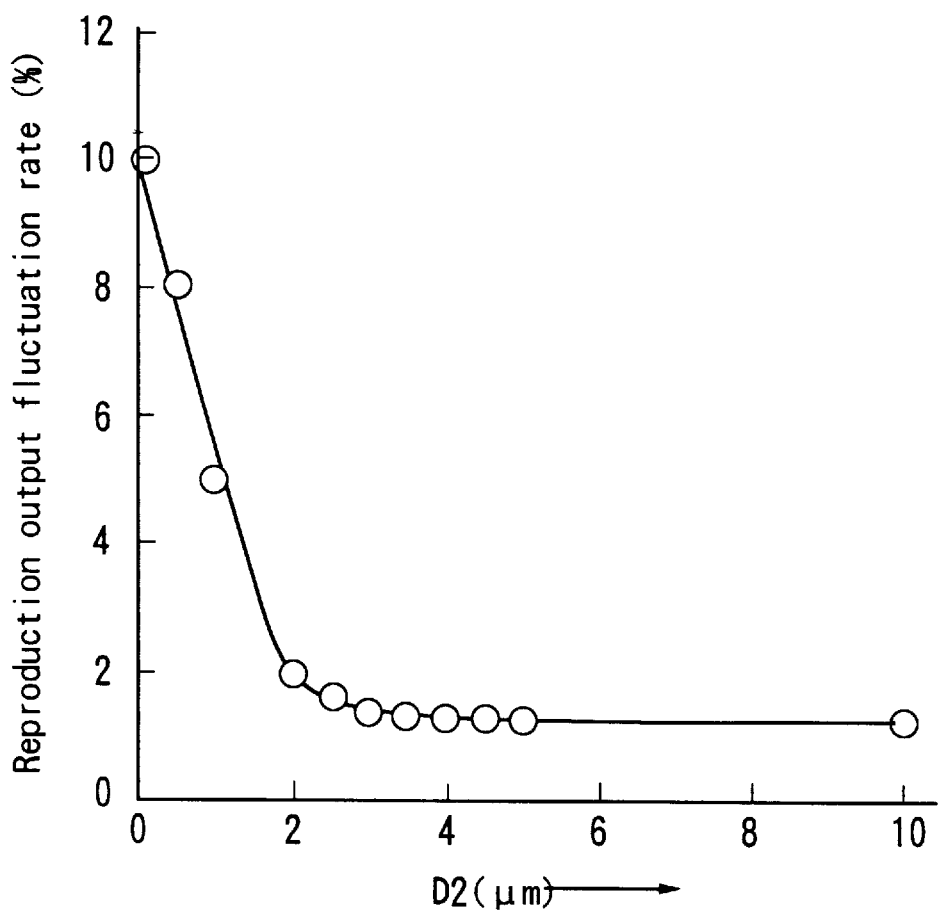
FIG. 12 is a graph showing the relationship between the distance D2 and the reproduction output fluctuation rate in the embodiment illustrated in FIGS. 7 to 9.

FIG. 12 is a graph showing the relationship between the distance D2 in the embodiment illustrated in FIGS. 7 to 9 and the reproduction output fluctuation rate. The structure of the essential portion of the magnetic head used to achieve these characteristics is as follows.

A. MR element 3
  MR film 30: spin valve film
    Film structure: Ta(5 nm)/NiFe (5 nm)/Cu (3 nm)/Co (3 nm)/FeMn (10 nm)/Ta (5 nm)
  Lead conductor films 34 and 35
    Magnetic domain control films 341 and 351: NiFeCr (5 nm)/CoPt (40 nm)/Ta (100 nm)
    Non-magnetic conductive film 342, 352: Cu(150 nm)
  Reproduction track width: 2.0 $\mu$m
  Insulating film 32: $Al_2O_3$ film, upper film thickness 100 nm,
  lower film thickness 100 nm B. Inductive magnetic conversion element 2
  Lower magnetic layer 21: NiFe film, film thickness 3 $\mu$m
  Upper magnetic layer 32: NiFe film, film thickness 4 $\mu$m Coil film 23: Cu film, 10 turns Gap film 24: $Al_2O_3$ film, film thickness 300 nm Protective film 26: $Al_2O_3$ film, film thickness 40 μm Recording track width: 2.5 μm 100 cycles of recording/reproduction were repeated using the combined type magnetic head described above, and its reproduction output fluctuation rate was determined. The reproduction output fluctuation rate was calculated in the manner described earlier. The reproduction output fluctuation rate achieved by the prior art is a value achieved when D2=0. As shown in the figure, the inflection point at which the reproduction output fluctuation rate is greatly improved is present in the vicinity where the distance D2 exceeds 1 μm and the reproduction output fluctuation rate is greatly improved in a range over which D2>1 μm.

Figure 13:
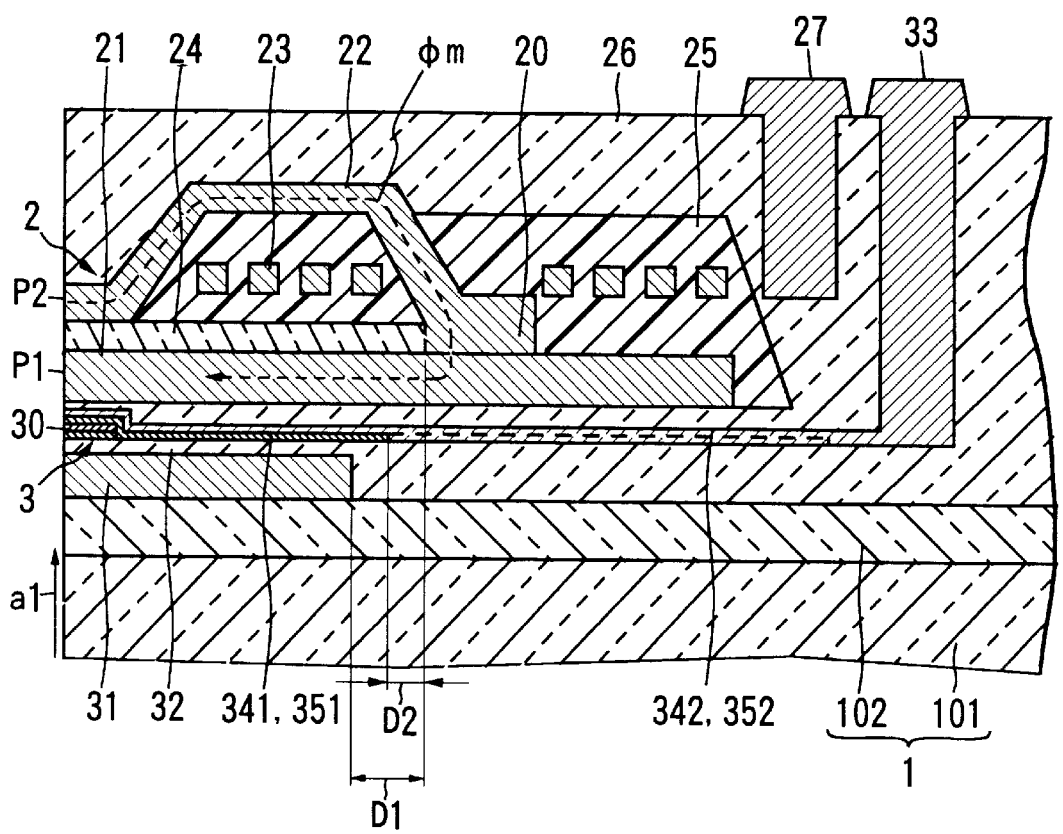
FIG. 13 is a cross section of another embodiment of the thin film magnetic head according to the present invention.
Figure 14:
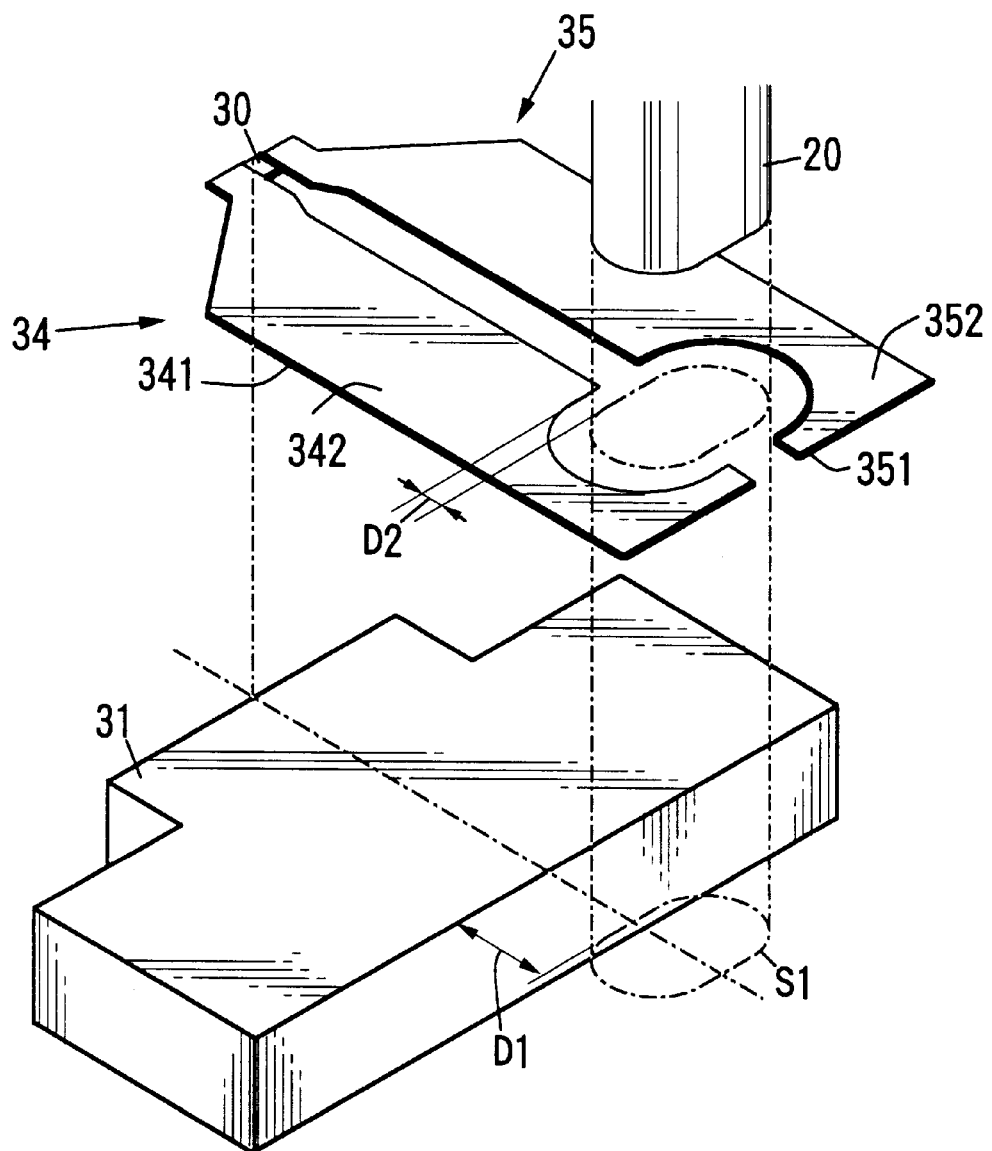
FIG. 14 is a perspective illustrating the positional relationship that the lower shield layer and the MR element have with the back gap portion of the inductive magnetic conversion element.

FIG. 13 is a cross section showing another embodiment of the thin film magnetic head according to the present invention and FIG. 14 is a perspective illustrating the positional relationship that the lower shield layer 31 and the MR element 3 may have with the back gap portion 20 of the inductive magnetic conversion element 2. In the figures, the same reference numbers are assigned to components that are identical to those shown in FIGS. 7 to 9 and their explanation is omitted. The lower shield layer 31 is formed outside of the projection area S1 which is achieved by projecting the back gap portion 20 onto the surface where the lower shield layer 31 is formed. In addition, the magnetic domain control films 341 and 351 constituting the lead conductor films 34 and 35 are formed outside of the projection area S1 achieved by projecting the back gap portion 20. Consequently, in this embodiment, the recording magnetic flux is restricted from leaking to the lower shield layer 31 and the magnetic domain control films 341 and 351. It is obvious that other combinations of the embodiments are possible although illustrations and explanation of them are omitted.

While the present invention has been explained in detail in reference to specific preferred embodiments, it is obvious to persons skilled in the field that a number of variations are possible in its form and detail without departing from the essence and scope of the present invention.

What is claimed is:

1. A thin film magnetic head comprising:

a slider;

at least one inductive magnetic conversion element having a thin film magnetic circuit constituted of a lower magnetic layer, an upper magnetic layer and a coil layer and provided on said slider, said upper magnetic layer and said lower magnetic layer constituting pole tips facing opposite each other over a gap layer at front ends thereof and having a back gap portion for completing said thin film magnetic circuit at the rear thereof; and at least one magnetoresistive conversion element provided on said slider positioned below said inductive magnetic conversion element, between said lower magnetic layer positioned above and a lower shield layer positioned below, said lower magnetic layer also functioning as an upper shield layer of said magnetoresistive conversion element and said lower shield layer formed outside a projection area achieved by projecting said back gap portion onto the surface where said lower shield layer is formed.

2. A thin film magnetic head according to claim 1, wherein the entirety of said lower shield layer is formed forward of said back gap portion.

3. A thin film magnetic head according to claim 1, wherein:

said lower shield layer is formed rearward of said back gap portion, avoiding said projection area achieved by projecting said back gap portion onto said surface where said lower shield layer is formed.

4. A thin film magnetic head comprising:

a slider;

at least one inductive magnetic conversion element having a thin film magnetic circuit constituted of a lower magnetic layer, an upper magnetic layer and a coil layer and provided on said slider, said upper magnetic layer and said lower magnetic layer constituting pole tips facing opposite each other over a gap layer at front ends thereof and having a back gap portion for completing said thin film magnetic circuit at the rear thereof; and at least one magnetoresistive conversion element provided on said slider positioned below said inductive magnetic conversion element, between said lower magnetic layer positioned above and a lower shield layer positioned below, said lower magnetic layer also functioning as an upper shield layer of said magnetoresistive conversion element, said magnetoresistive conversion element further including a magnetoresistive film and a magnetic domain control film, said magnetic domain control film provided to apply magnetic domain control upon said magnetoresistive film and formed outside a projection area achieved by projecting said back gap portion onto a surface where said magnetic domain control film is formed.

5. A thin film magnetic head according to claim 4, wherein:

the entirety of said magnetic domain control film is formed forward of said back gap portion.

6. A thin film magnetic head according to claim 4, wherein:

said magnetic domain control film is formed rearward of said back gap portion, avoiding said projection area achieved by projecting said back gap portion onto said surface where said lower shield layer is formed.

7. A thin film magnetic head according to claim 4, wherein said lower shield layer is formed outside a projection area achieved by projecting said back gap portion onto a surface where said lower shield layer is formed.

* * * * *